US012066787B2

(12) United States Patent
Nakano

(10) Patent No.: US 12,066,787 B2
(45) Date of Patent: *Aug. 20, 2024

(54) IMAGE FORMING APPARATUS

(71) Applicant: BROTHER KOGYO KABUSHIKI KAISHA, Nagoya (JP)

(72) Inventor: Hiroshi Nakano, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,715

(22) Filed: Feb. 14, 2023

(65) Prior Publication Data

US 2023/0185232 A1 Jun. 15, 2023

Related U.S. Application Data

(63) Continuation of application No. 17/711,095, filed on Apr. 1, 2022, now Pat. No. 11,609,533.

(30) Foreign Application Priority Data

Apr. 1, 2021 (JP) ................................ 2021-062497

(51) Int. Cl.
*G03G 21/18* (2006.01)

(52) U.S. Cl.
CPC ..... *G03G 21/1807* (2013.01); *G03G 21/1814* (2013.01); *G03G 21/1857* (2013.01)

(58) Field of Classification Search
CPC ........... G03G 15/0121; G03G 21/1807; G03G 21/1814; G03G 21/1857; G03G 21/186; G03G 2215/0103; G03G 2215/0119
See application file for complete search history.

(56) References Cited

U.S. PATENT DOCUMENTS

| | | | |
|---|---|---|---|
| 9,791,803 B2 * | 10/2017 | Sawashima ........ G03G 15/0808 |
| 10,042,300 B2 | 8/2018 | Endoh |
| 11,237,497 B2 | 2/2022 | Sakaguchi et al. |
| 2016/0349664 A1 | 12/2016 | Sawashima |

FOREIGN PATENT DOCUMENTS

| | | |
|---|---|---|
| JP | 2006-292868 A | 10/2006 |
| JP | 2012-128017 A | 7/2012 |
| JP | 2016-224418 A | 12/2016 |

* cited by examiner

*Primary Examiner* — Hoang X Ngo

(74) *Attorney, Agent, or Firm* — Merchant & Gould P.C.

(57) ABSTRACT

An image forming apparatus, having process units, a transfer unit, a motor, first through fourth cams, a color-linkage gear train, a monochrome-transmission gear train, and a color-transmission gear train, is provided. Each of the process units has a developing unit including a developing roller and a drum unit including a photosensitive drum. The color-linkage gear train rotates the first cam, the second cam, and the third cam in shifted phases. The monochrome-transmission gear train transmits a driving force from the motor to a monochrome clutch, which engages and disengages transmission of the driving force from the monochrome-transmission gear train to the fourth cam. The color-transmission gear train transmits the driving force from the motor to a color clutch, which engages and disengages transmission of the driving force from the color-transmission gear train to the color-linkage gear train.

12 Claims, 13 Drawing Sheets

IMAGE FORMING APPARATUS

REFERENCE TO RELATED APPLICATIONS

This application is a continuation of U.S. patent application of Ser. No. 17/711,095 filed Apr. 1, 2022, now U.S. Pat. No. 11,609,533, that claims priority from Japanese Patent Application No. 2021-062497, filed on Apr. 1, 2021, the entire subject matter of both of which are incorporated herein by reference.

BACKGROUND ART

Technical Field

The present disclosure is related to an image forming apparatus capable of moving developing rollers between respective pressed positions, in which the developing rollers are pressed against photosensitive drums, and respective separated positions, in which the developing rollers are separated from the photosensitive drums.

Background

An image forming apparatus capable of moving developing rollers between respective pressed positions, in which the developing rollers are pressed against photosensitive drums, and respective separated positions, in which the developing rollers are separated from the photosensitive drums, is known. For example, the image forming apparatus may have three developing rollers, which correspond to colors of yellow, magenta, and cyan, respectively, arranged along a moving direction of a belt, from upstream to downstream, in this recited order. The three developing rollers may be collectively moved to be pressed against or separated from the respective photosensitive drums at a time.

DESCRIPTION

Summary

In order to maintain toners to be used for image forming in a better condition or prevent the toners from deteriorating to a possible extent, it may be preferable to press the developing rollers against the photosensitive drums for minimum lengths of time necessary for transferring the toners from the photosensitive drums to the belt. In the known image forming apparatus, however, the developing rollers are moved collectively to be pressed against or separated from the respective photosensitive drums. Therefore, one or two of the three developing rollers for one or two of the three colors may be pressed against or separated from the developing roller(s) earlier than or later than the timing necessary for developing images.

The present disclosure is advantageous in that an image forming apparatus, in which developing rollers may be pressed against or separated from photosensitive drums sequentially, is provided.

According to an aspect of the present disclosure, an image forming apparatus, having a plurality of process units, a transfer unit, a motor, a first cam, a second cam, a third cam, a fourth cam, a color-linkage gear train, a monochrome-transmission gear train, and a color-transmission gear train, is provided. Each of the plurality of process units corresponds to each one of a first color, a second color, a third color, and a fourth color. Each of the plurality of process units has a developing unit including a developing roller and a drum unit including a photosensitive drum. The transfer unit has a belt arranged to partly face the photosensitive drums in the plurality of process units. The first cam is configured to move the developing roller with respect to the photosensitive drum in a first one of the plurality of process units corresponding to the first color between a pressed position and a separated position corresponding to the first color. The second cam is configured to move the developing roller with respect to the photosensitive drum in second one of the plurality of process units corresponding to the second color between a pressed position and a separated position corresponding to the second color. The third cam is configured to move the developing roller with respect to the photosensitive drum in a third one of the plurality of process units corresponding to the third color between a pressed position and a separated position corresponding to the third color. The fourth cam is configured to move the developing roller with respect to the photosensitive drum in a fourth one of the plurality of process units corresponding to the fourth color between a pressed position and a separated position corresponding to the fourth color. The color-linkage gear train is configured to rotate the first cam, the second cam, and the third cam mechanically in conjunction with one another in phases shifted from one another. The color-linkage gear train maintains the phases of the first cam, the second cam, and the third cam shifted to operate the first cam, the second cam, and the third cam in conjunction with one another. The monochrome-transmission gear train is configured to transmit a driving force from the motor to a monochrome clutch, which is configured to engage and disengage transmission of the driving force from the monochrome-transmission gear train to the fourth cam. The color-transmission gear train is configured to transmit the driving force from the motor to a color clutch, which is configured to engage and disengage transmission of the driving force from the color-transmission gear train to the color-linkage gear train.

An image forming apparatus, having a first developing roller, a first photosensitive drum, a second developing roller, a second photosensitive drum, a third developing roller, a third photosensitive drum, a fourth developing roller, a fourth photosensitive drum, a motor, a first cam, a second cam, a third cam, a fourth cam, a linkage gear train, a first transmission gear train, and a second transmission gear train, is provided. The first cam is configured to move the first developing roller with respect to the first photosensitive drum between a first pressed position, in which the first developing roller is pressed against the first photosensitive drum, and a first separated position, in which the first developing roller is separated from the first photosensitive drum. The second cam is configured to move the second developing roller with respect to the second photosensitive drum between a second pressed position, in which the second developing roller is pressed against the second photosensitive drum, and a second separated position, in which the second developing roller is separated from the second photosensitive drum. The third cam is configured to move the third developing roller with respect to the third photosensitive drum between a third pressed position, in which the third developing roller is pressed against the third photosensitive drum, and a third separated position, in which the third developing roller is separated from the third photosensitive drum. The fourth cam is configured to move the fourth developing roller with respect to the fourth photosensitive drum between a fourth pressed position, in which the fourth developing roller is pressed against the fourth photosensitive drum, and a fourth separated position, in which the fourth developing roller is separated from the fourth photosensitive drum. The linkage gear train is configured to rotate the first cam, the second dam, and the third cam synchronously in phases shifted from one another. The first transmission gear train is configured to transmit a driving force from the motor to a first clutch, which is configured to engage and disengage transmission of the driving force from the first transmission gear train to the fourth cam. The second transmission gear train is configured to transmit the driving force from the motor to a second clutch, which is configured to engage and disengage transmission of the driving force from the second transmission gear train to the linkage gear train.

FIRST EMBODIMENT

In the following paragraphs, with reference to the accompanying drawings, an image forming apparatus 1 according to a first embodiment of the present disclosure will be described. It is noted that the printer described below is merely one embodiment of the present disclosure, and various connections may be set forth between elements in the following description. These connections in general and, unless specified otherwise, may be direct or indirect and that this specification is not intended to be limiting in this respect.

Figure 1:
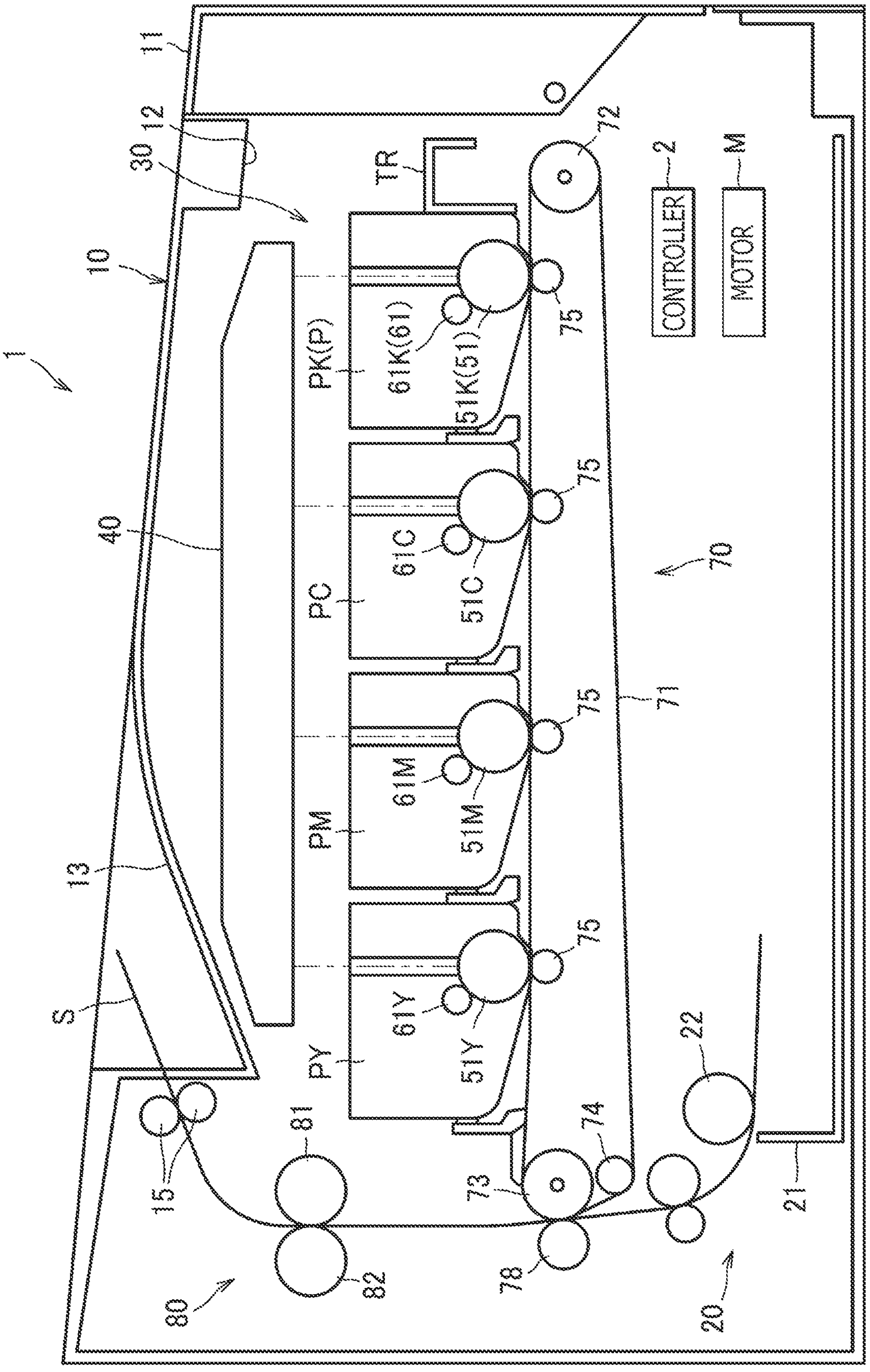
FIG. 1 is an illustrative overall view of an image forming apparatus according to embodiments of the present disclosure.

The image forming apparatus 1 shown in FIG. 1 according to the first embodiment is a color laser printer, which may form multicolored images on sheets S with use of electrophotographic technics. The image forming apparatus 1 includes a housing 10, a sheet feeder 20, an image forming device 30, a controller 2, and a motor M. In the present embodiment, a right-hand side, a left-hand side, an upper side, and a lower side in FIG. 1 to a viewer coincide with a front side, a rear side, an upper side and a lower side of the image forming apparatus 1, respectively. Moreover, a nearer side and a farther side in FIG. 1 coincide with a leftward side and a rightward side of the image forming apparatus 1, respectively.

The housing 10 includes a front cover 11 and an ejection tray 13. The front cover 11 is pivotable about a lower edge thereof to cover or expose an opening 12, which is formed on the front side of the housing 10.

The sheet feeder 20 includes a sheet tray 21, in which the sheets S may be stored, and a feed roller 22. The sheets S is a printing medium, on which images may be formed in the image forming apparatus 1, and may include regular paper, envelope, postcard, thin paper, cardboard, glossy paper, resin sheet, and sticker sheet.

The image forming device 30 includes a plurality of process units P, a cartridge tray TR, an exposure device 40, a transfer unit 70, a secondary transfer roller 78, a fuser 80, and ejection rollers 15.

The plurality of process units P include four (4) process units PY, PM, PC, and PK, which correspond to colors of yellow, magenta, cyan, and black, respectively, on one-to-one basis. In the embodiments of the present disclosure, yellow, magenta, cyan, and black may be called as a first color, a second color, a third color, and a fourth color, respectively. In the following paragraphs, identical items provided for each of the colors of yellow, magenta, cyan, and black may be distinguished by suffixes -Y, -M, -C, and -K, respectively, appended to respective reference signs. Meanwhile, the identical items may be collectively described in a singular form by a reference sign alone without the suffix -Y, -M, -C, or -K.

Figure 2:
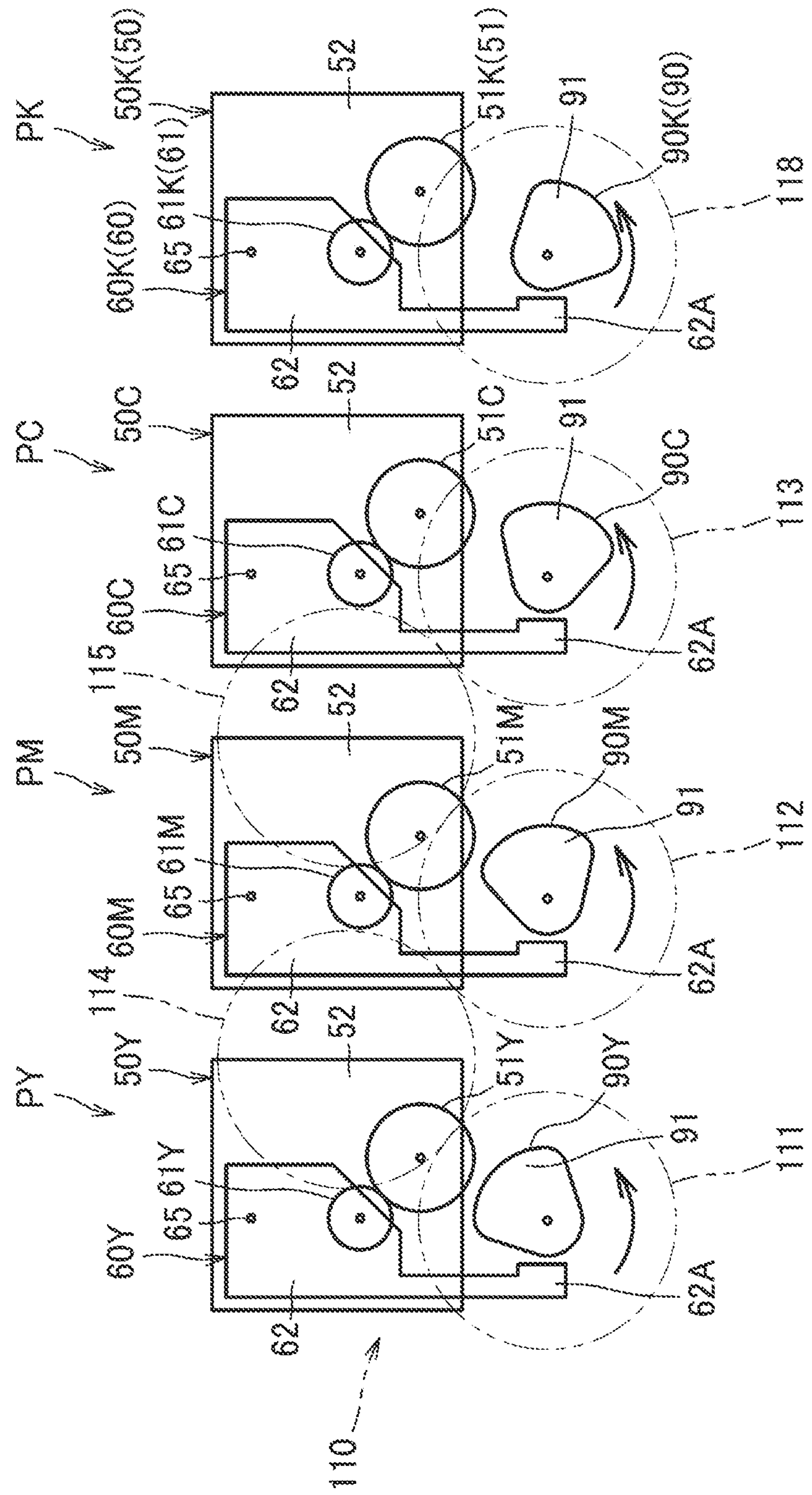
FIG. 2 illustrates an exemplary configuration of a mechanical linkage to move developing rollers to contact or separate from photosensitive drums according to the embodiments of the present disclosure, in which the developing rollers are located at pressed positions.

As shown in FIG. 2, each process unit P has a developing unit 60, which includes a developing roller 61, and a drum unit 50, which includes a photosensitive drum 51. The developing unit 60 includes a developing unit 60Y, which includes a developing roller 61Y corresponding to yellow; a developing unit 60M, which includes a developing roller 61M corresponding to magenta; a developing unit 60C, which includes a developing roller 61C corresponding to cyan; and a developing unit 60K, which includes a developing roller 61K corresponding to black. The drum unit 50 includes a drum unit 50Y, which includes a photosensitive drum 51Y corresponding to yellow; a drum unit 50M, which includes a photosensitive drum 51M corresponding to magenta; a drum unit 50C, which includes a photosensitive drum 51C corresponding to cyan; and a drum unit 50K, which includes a photosensitive drum 51K corresponding to black. Each of the drum units 50Y, 50M, 50C, 50K includes a charger to charge the photosensitive drums 51Y, 51M, 51C, 51K, respectively, although illustration of the chargers is omitted in the drawings.

The developing unit 60 has a developing frame 62 to store a toner. The developing roller 61 is rotatably supported by the developing frame 62. The drum unit 50 includes a drum frame 52. The photosensitive drum 51 is rotatably supported by the drum frame 52.

Figure 3:
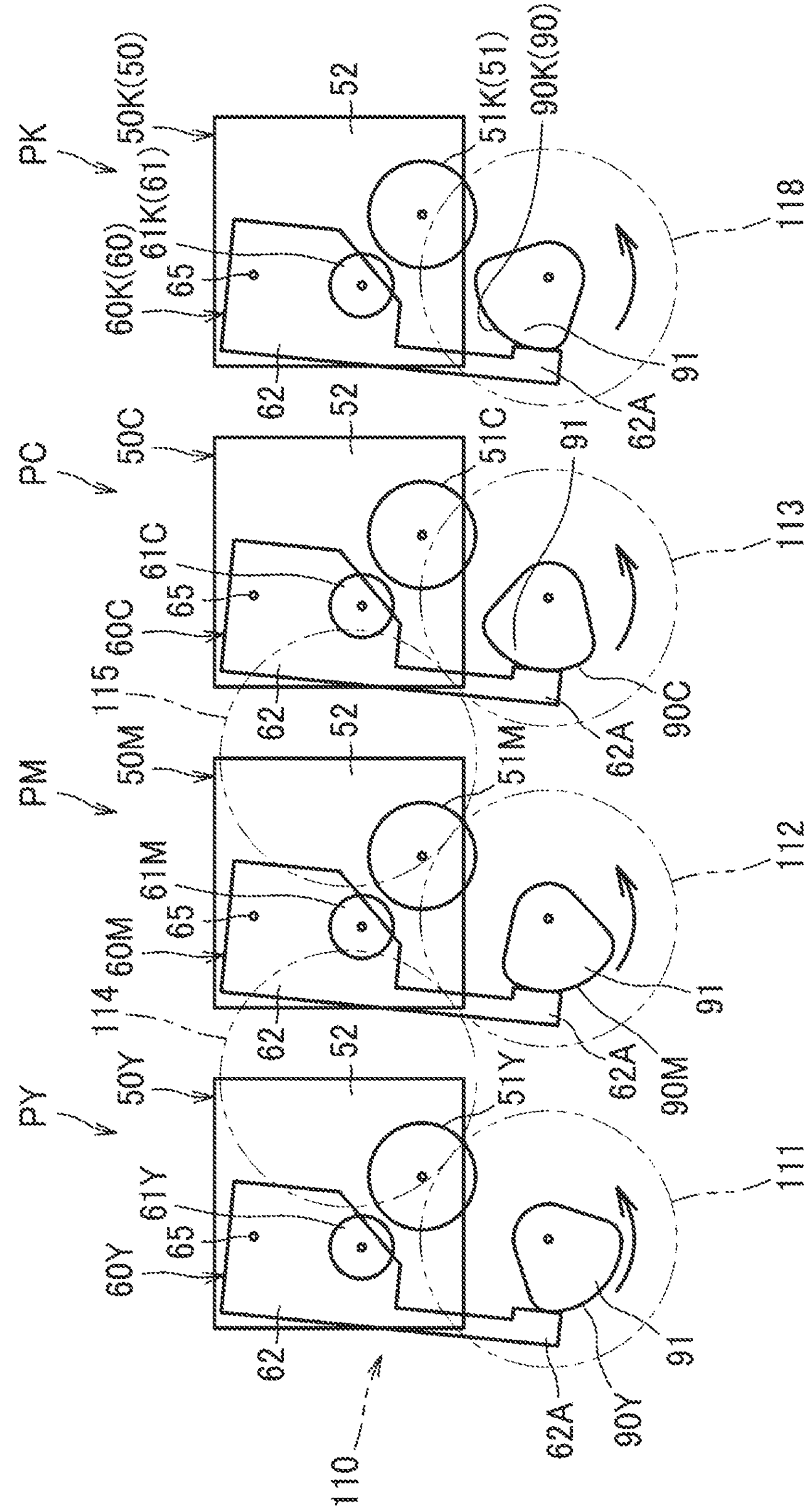
FIG. 3 illustrates an exemplary configuration of the mechanical linkage to move the developing rollers to contact or separate from the photosensitive drums according to the embodiments of the present disclosure, in which the developing rollers are located at separated positions.

The process unit P has a hinge 65, which couples the developing unit 60 to the drum unit 50 and enables the developing unit 60 to swing between a pressed position, in which the developing roller 61 is pressed against the corresponding photosensitive drum 51, and a separated position, in which the developing roller 61 is separated from the corresponding photosensitive drum 51. In particular, the developing frame 62 is coupled to the drum frame 52 swingably through the hinge 65. In this arrangement, the developing unit 60 is swingable between the position, in which the developing roller 61 is pressed against the corresponding photosensitive drum 51, as shown in FIG. 2, and the position, in which the developing roller 61 is separated from the corresponding photosensitive drum 51, as shown in FIG. 3. Moreover, while the developing frame 62 and the drum frame 52 are coupled through the hinge 65, the developing unit 60 is inseparable from the drum unit 50. The developing frame 62 has a separation lever 62A, which may cause the developing frame 62 to swing by being pressed by a cam 90 described later. The separation lever 62A longitudinally extends downward. The developing frame 62 is, although not illustrated in the drawings, urged by a spring (not shown) in a direction, in which the developing roller 61 is pressed against the photosensitive drum 51, along a rotating direction thereof about the hinge 65.

Referring back to FIG. 1, the cartridge tray TR is a tray, on which the process unit P is mountable. The cartridge tray TR is slidably movable with respect to the housing 10. The cartridge tray TR may be, when the front cover 11 is open, drawn outward from the housing 10 through the opening 12 or may be attached to the housing 10 through the opening 12.

The exposure device 40 includes laser diodes, optical deflectors, lenses, and mirrors, which are not shown. The exposure device 40 may emit a plurality of laser beams, as illustrated by dash-and-dots lines, to expose surfaces of the photosensitive drums 51Y, 51M, 51C, 51K.

The transfer unit 70 includes a belt 71 being an endless belt, a driving roller 72, a driven roller 73, a tension roller 74, and a plurality of transfer rollers 75. The belt 71 is strained around the driving roller 72, the driven roller 73, and the tension roller 74. The belt 71 is in an arrangement such that an outer surface thereof faces the photosensitive drums 51Y, 51M, 51C, 51K in the process unit P. The transfer rollers 75 are located on an inner side of the belt 71 to nip the belt 71 with the photosensitive drums 51Y, 51M, 51C, 51K.

The secondary transfer roller 78 is located rearward with respect to the driven roller 73 to nip the belt 71 with the driven roller 73. The secondary transfer roller 78 may transfer toner images formed on the belt 71 to the sheet S being conveyed through the position between the driven roller 73 and the secondary transfer roller 78.

The fuser 80 is located rearward with respect to the process unit P. The fuser 80 includes a heat roller 81 and a pressure roller 82 located to face the heat roller 81.

The ejection rollers 15 are located at upper positions with respect to the fuser 80 and may eject the sheet S exiting the fuser 80 outward to rest on the ejection tray 13.

In the image forming device 30, the surface of the photosensitive drum 51 may be charged evenly by the chargers and exposed to the laser beams emitted from the exposure device 40. Thereby, electrostatic latent images based on image data may be formed on the photosensitive drum 51. Meanwhile, the toner in the developing unit 60 may be applied to the surface of the developing roller 61 and supplied from the developing roller 61 located at a contact position to the electrostatic latent image formed on the photosensitive drum 51. Thereby, the toner image may be formed on the photosensitive drum 51. The toner image on the photosensitive drum 51 may be thereafter transferred to the belt 71 when the toner image passes through the position between the transfer roller 75 and the photosensitive drum 51, and the belt 71 carries the transferred toner image to the position between the driven roller 73 and the secondary transfer roller 78. Further, the toner image carried on the belt 71 may be transferred to the surface of the sheet S conveyed to the position between the belt 71 and the secondary transfer roller 78. Furthermore, when the sheet S with the toner image transferred thereon passes through a position between the heat roller 81 and the pressure roller 82, the toner image may be fused and fixed onto the sheet S. The sheet S may be ejected by the ejection rollers 15 to rest on the ejection tray 13.

Next, a configuration to move the developing roller 61 to be pressed against or separated from the photosensitive drum 51 will be described. As shown in FIG. 2, the image forming apparatus 1 has a mechanical linkage, which includes a cam 90, a color-linkage gear train 110, and a fourth cam gear 118, to move the developing roller 61 to be pressed against or separated from the photosensitive drum 51.

The cam 90 includes a plurality of cams including a first cam 90Y, a second cam 90M, a third cam 90C, and a fourth cam 90K. The first cam 90Y may move the developing roller 61Y for yellow with respect to the corresponding photosensitive drum 51Y between a pressed position and a separated position. The second cam 90M may move the developing roller 61M for magenta with respect to the corresponding photosensitive drum 51M between a pressed position and a separated position. The third cam 90C may move the developing roller 61C for cyan with respect to the corresponding photosensitive drum 51C between a pressed position and a separated position. The fourth cam 90K may move the developing roller 61K for black with respect to the corresponding photosensitive drum 51K between a pressed position and a separated position. The first cam 90Y, the second cam 90M, the third cam 90C, and the fourth cam 90K are arranged in this recited order, i.e., in an order of the first cam 90Y, the second cam 90M, the third cam 90C, and the fourth cam 90K, from upstream to downstream in a moving direction of the belt 71 to move through a range, in which the belt 71 faces the photosensitive drums 51Y, 51M, 51C, 51K. In other words, the first cam 90Y is located at a most upstream position, the second cam 90M is located at a second upstream position, the third cam 90C is located at a third upstream position, and the fourth cam 90K is located at a fourth upstream or most downstream position in the moving direction of the belt 71.

The color-linkage gear train 110 is a gear train to rotate the first cam 90Y, the second cam 90M, and the third cam 90C mechanically in conjunction with one another. The color-linkage gear train 110 includes a first cam gear 111, a second cam gear 112, a third cam gear 113, a 1-2 idle gear 114, and a 2-3 idle gear 115. Diameters of the first cam gear 111, the second cam gear 112, the third cam gear 113, the 1-2 idle gear 114, and the 2-3 idle gear 115 in the color-linkage gear train 110 are equal. The first cam gear 111 is a gear, in which the first cam 90Y is integrally formed, and rotates integrally with the first cam 90Y. The second cam gear 112 is a gear, in which the second cam 90M is integrally formed, and rotates integrally with the second cam 90M. The third cam gear 113 is a gear, in which the third cam 90C is integrally formed, and rotates integrally with the third cam 90C. The 1-2 idle gear 114 is an idle gear engaging with the first cam gear 111 and the second cam gear 112. The 2-3 idle gear 115 is an idle gear engaging with the second cam gear 112 and the third cam gear 113. The fourth cam 90K for black is formed integrally with the fourth cam gear 118. A diameter of the fourth cam gear 118 is equal to the diameter of the first cam gear 111, the second cam gear 112, the third cam gear 113, the 1-2 idle gear 114, and the 2-3 idle gear 115 in the color-linkage gear train 110. By being interlocked with one another, each one of the gears composing the color-linkage gear train 110 may rotate mechanically in conjunction with rotation of the other gears in the color-linkage gear train 110.

The cam 90 has a cam lobe 91. As shown in FIG. 2, positions of the cam lobe 91 in the first cam 90Y, the cam lobe 91 in the second cam 90M, and the cam lobe 91 in the third cam 90C are in phases shifted from one another by a predetermined angle. The color-linkage gear train 110 maintains the first cam 90Y, the second cam 90M, and the third cam 90C in the shifted phases to operate in conjunction with one another.

The cam 90 may rotate by a driving force from the motor M. As shown in FIG. 2, when the cam lobe 91 is not in contact with the separation lever 62A, the developing roller 61 is pressed against the photosensitive drum 51 by an urging force of a spring, which is not shown. In contrast, as shown in FIG. 3, when the cam lobe 91 contacts and moves the separation lever 62A rearward, the developing roller 61 separates from the photosensitive drum 51.

Figure 4:
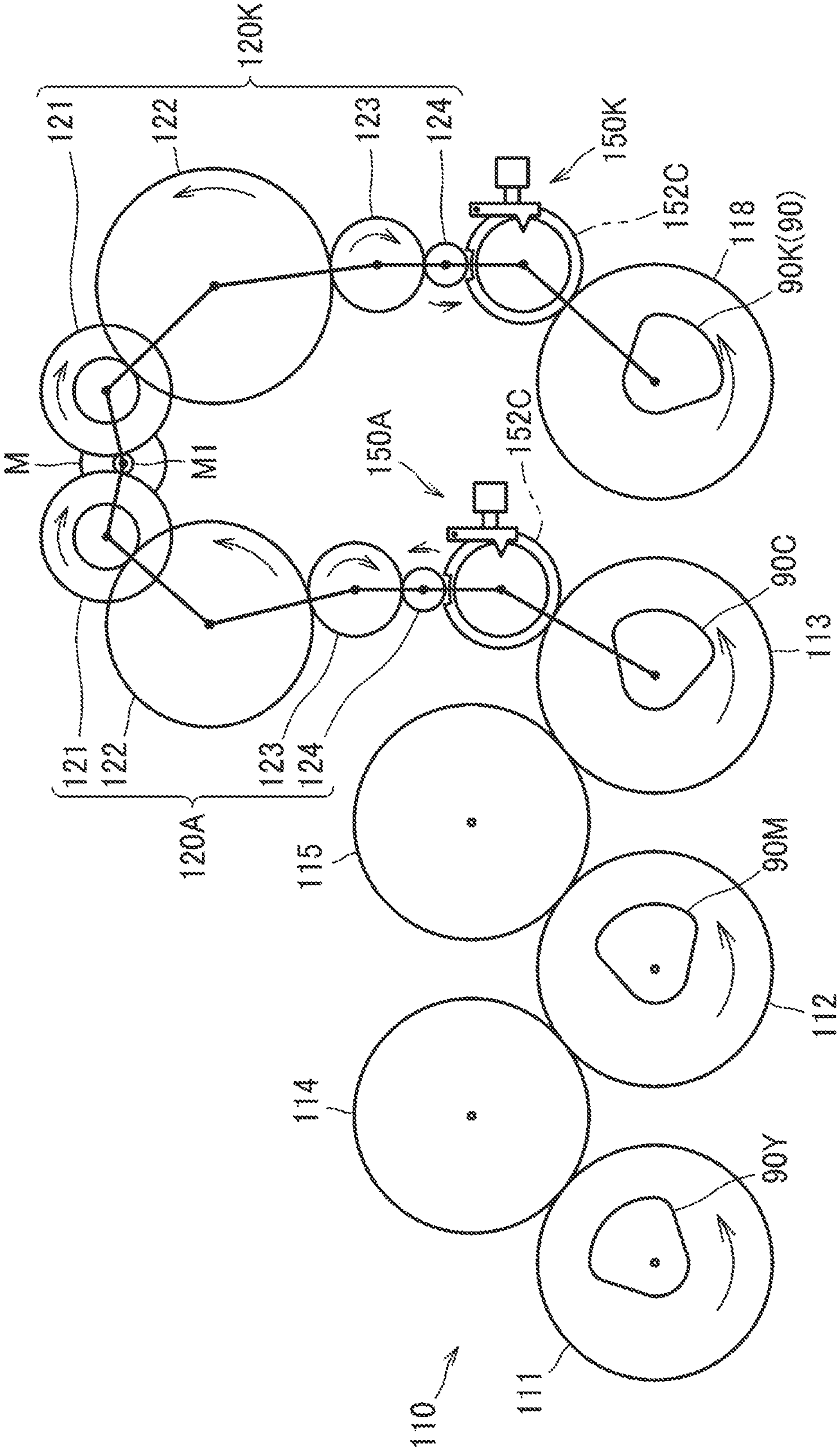
FIG. 4 illustrates gear trains in the image forming apparatus according to a first embodiment of the present disclosure.

Next, a configuration to operate the color-linkage gear train 110 and the fourth cam gear 118 to rotate or to stop rotating will be described. As shown in FIG. 4, the image forming apparatus 1 has mechanical linkages for transmitting the driving force from the motor M to the color-linkage gear train 110 and to the fourth cam gear 118. The mechanical linkage for transmitting the driving force from the motor M to the fourth cam gear 118 includes a monochrome-transmission gear train 120K and a monochrome clutch 150K. The mechanical linkage for transmitting the driving force from the motor M to the color-linkage gear train 110 includes a color-transmission gear train 120A and a color clutch 150A.

The motor M includes an output gear M1, which is attached to an output shaft of the motor M. The motor M may be activated under control of the controller 2.

The monochrome-transmission gear train 120K includes a first idle gear 121, a second idle gear 122, a third idle gear 123, and a fourth idle gear 124. The first idle gear 121 meshes with the output gear M1. The second idle gear 122 meshes with the first idle gear 121. The third idle gear 123 meshes with the second idle gear 122. The fourth idle gear 124 meshes with the third idle gear 123. The monochrome-transmission gear train 120K transmits the driving force from the motor M to the monochrome clutch 150K.

Figure 5B:
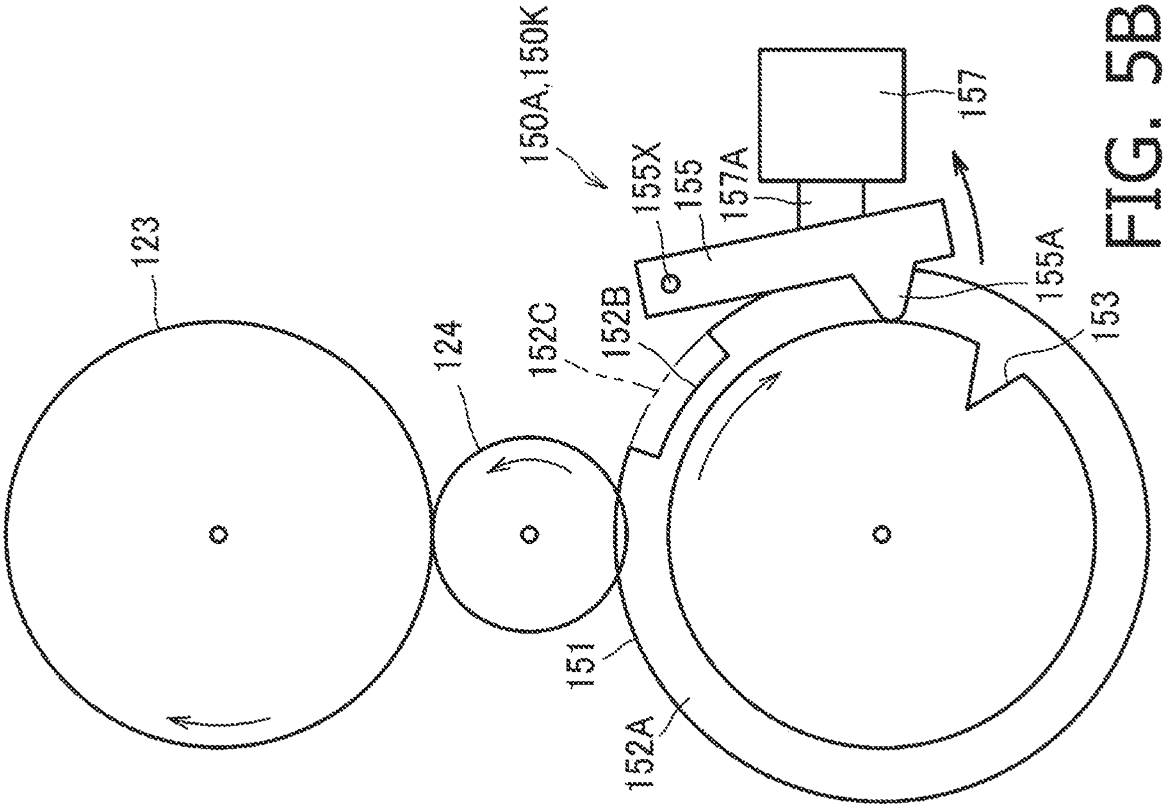
FIG. 5B illustrates a configuration of the clutch in a transmitting condition according to the embodiments of the present disclosure.
Figure 5A:
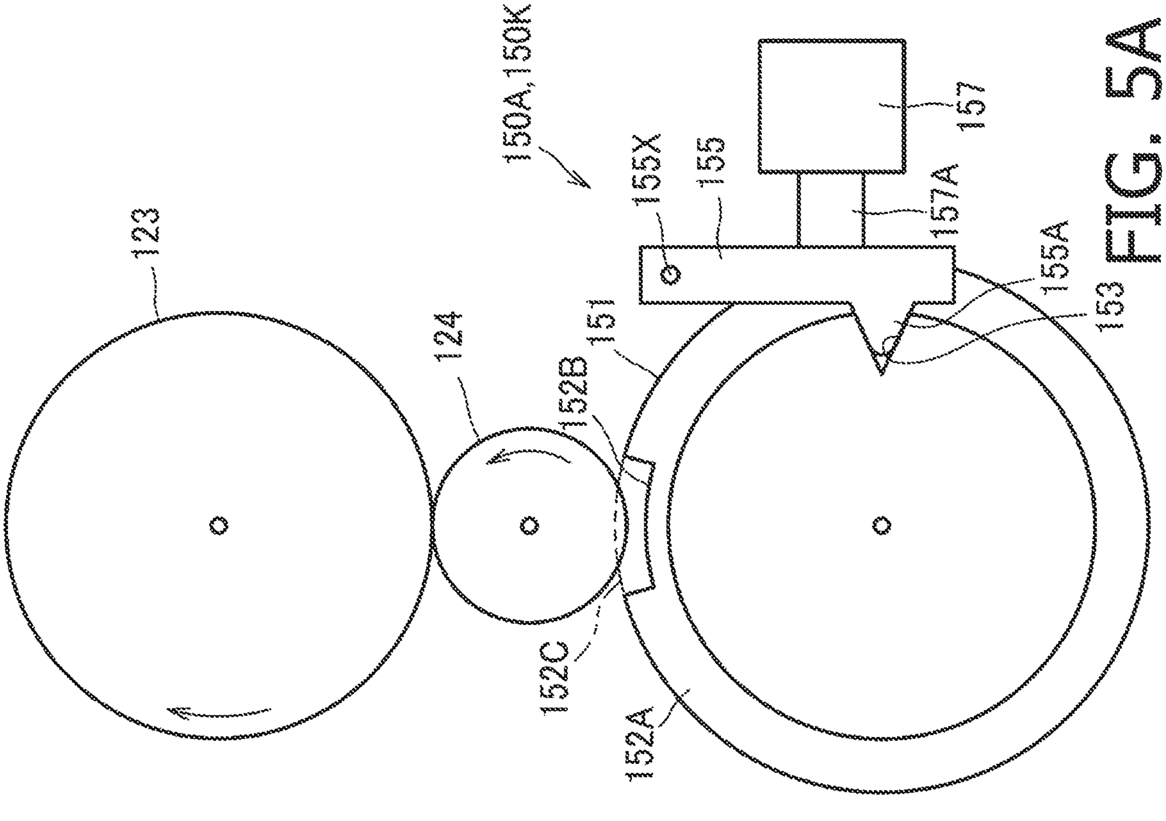
FIG. 5A illustrates a configuration of a clutch in a disconnecting condition according to the embodiments of the present disclosure.

The monochrome clutch 150K is a clutch to engage and disengage power transmission from the monochrome-transmission gear train 120K to the fourth cam 90K. As shown in FIGS. 5A-5B, the monochrome clutch 150K includes a clutch gear 151, a lever 155, and a solenoid actuator 157. The clutch gear 151 includes a sector-gear portion 152A, which has gear teeth formed on an outer periphery thereof, and a no-tooth portion 152B, in which no tooth is formed. Although not shown in detail in the drawings, the clutch gear 151 has an output gear 152C, which has gear teeth on an outer periphery thereof, at a position displaced in an axial direction from the sector-gear portion 152A. A diameter of the output gear 152C is equal to a diameter of the sector-gear portion 152A. The output gear 152C does not mesh with the fourth idle gear 124 but meshes with the fourth cam gear 118. Moreover, the clutch gear 151 has a notch 153 on the outer periphery thereof at a position displaced in the axial direction from the sector-gear portion 152A.

The lever 155 is swingable about a swing axis 155X. The lever 155 has a protrusion 155A, which is engageable with the notch 153. The lever 155 is urged by a spring, which is not shown, in a direction, in which the protrusion 155A may engage with the notch 153. In a state where the protrusion 155A of the lever 155 engages with the notch 153, the no-tooth portion 152B faces the fourth idle gear 124; therefore, the monochrome clutch 150K is placed in a disconnecting condition, in which the driving force from the motor M may not be transmitted from the fourth idle gear 124 to the clutch gear 151. Meanwhile, the monochrome clutch 150K has a spring (not shown), which urges the clutch gear 151 when the monochrome clutch 150K is in the disconnecting condition (see FIG. 5A) in a clockwise direction in FIG. 5A.

The solenoid actuator 157 has an operable portion 157A, which is connected to the lever 155. The solenoid actuator 157 may, when an electric current is applied, attract the operable portion 157A and maintain the operable portion 157A attracted for a predetermined length of time. When the clutch gear 151 rotates in the clockwise direction from the disconnecting condition (see FIG. 5A) and the sector-gear portion 152A meshes with the fourth idle gear 124 as shown in FIG. 5B, the monochrome clutch 150K may be placed in a transmitting condition, in which the clutch gear 151 may be rotated in the clockwise direction by fourth idle gear 124. Once the sector-gear portion 152A meshes with the fourth idle gear 124, the electrical current to the solenoid actuator 157 is halted. Thereafter, when the clutch gear 151 rotates one revolution from the disconnecting condition, the no-tooth portion 152B may face the fourth idle gear 124 once again, and the protrusion 155A may engage with the notch 153; therefore, the clutch gear 151 may stop rotating.

The diameter of the output gear 152C is equal to a half of the diameter of the fourth cam gear 118. Therefore, when the clutch gear 151 rotates one revolution and stops, the fourth cam gear 118 rotates a half revolution and stops thereat. Thus, each time the solenoid actuator 157 operates, the fourth cam gear 118 rotates a half revolution, and the fourth cam 95K rotates by 180 degrees accordingly.

The color-transmission gear train 120A includes, similarly to the monochrome-transmission gear train 120K, a first idle gear 121, a second idle gear 122, a third idle gear 123, and a fourth idle gear 124. The first idle gear 121 meshes with the output gear M1. The second idle gear 122 meshes with the first idle gear 121. The third idle gear 123 meshes with the second idle gear 122. The fourth idle gear 124 meshes with the third idle gear 123. The color-transmission gear train 120A transmits the driving force from the motor M to the color clutch 150A.

The color clutch 150A is a clutch to engage and disengage power transmission from the color-transmission gear train 120A to the color-linkage gear train 110. The color clutch 150A is in the same configuration as the monochrome clutch 150K; therefore, detailed description of the color clutch 150A will be herein omitted. The sector-gear portion 152A of the color clutch 150A may mesh with the fourth idle gear 124 in the color-transmission gear train 120A.

When the controller 2 is in a standby state, in which the image forming apparatus 1 is not forming an image, the controller 2 may locate the developing rollers 61Y, 61M, 61C, 61K in the respective separated positions, as shown in FIG. 2. When the image forming apparatus 1 receives a print job, the controller 2 may drive the transfer unit 70, move the belt 71, and expose the photosensitive drums 51Y, 51M, 51C, 51K for yellow, magenta, cyan, and black, sequentially in this recited order, to the beams from the exposure device 40. Moreover, the controller 2 may move the solenoid actuator 157 for the color clutch 150A and the solenoid actuator 157 for the monochrome clutch 150K at predetermined timings to rotate the first cam 90Y, the second cam 90M, and the third cam 90C, and the fourth cam 90K, respectively.

Figure 6A:
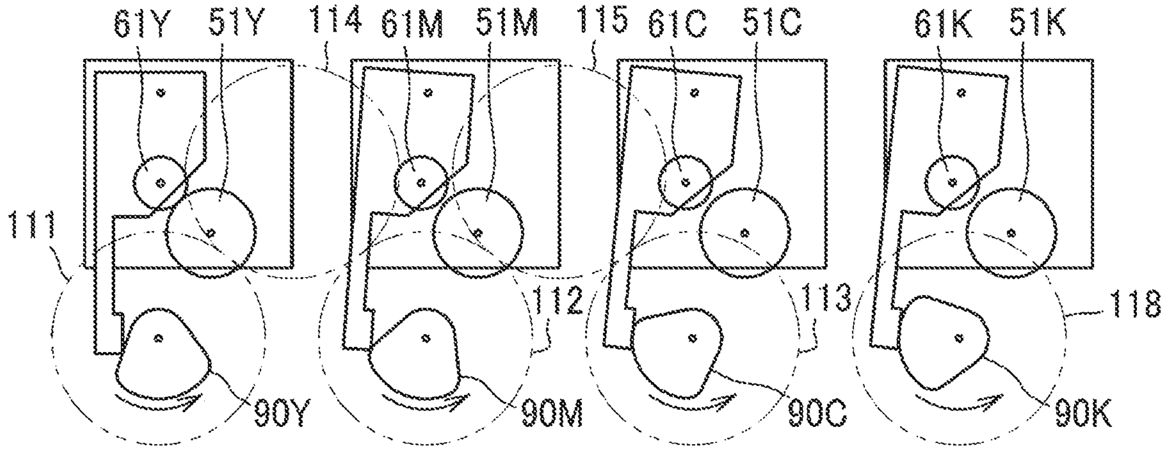
FIGS. 6A-6D illustrate behaviors of the developing rollers to be pressed against the photosensitive drums sequentially from upstream to downstream in the image forming apparatus according to the embodiments of the present disclosure.
Figure 6B:
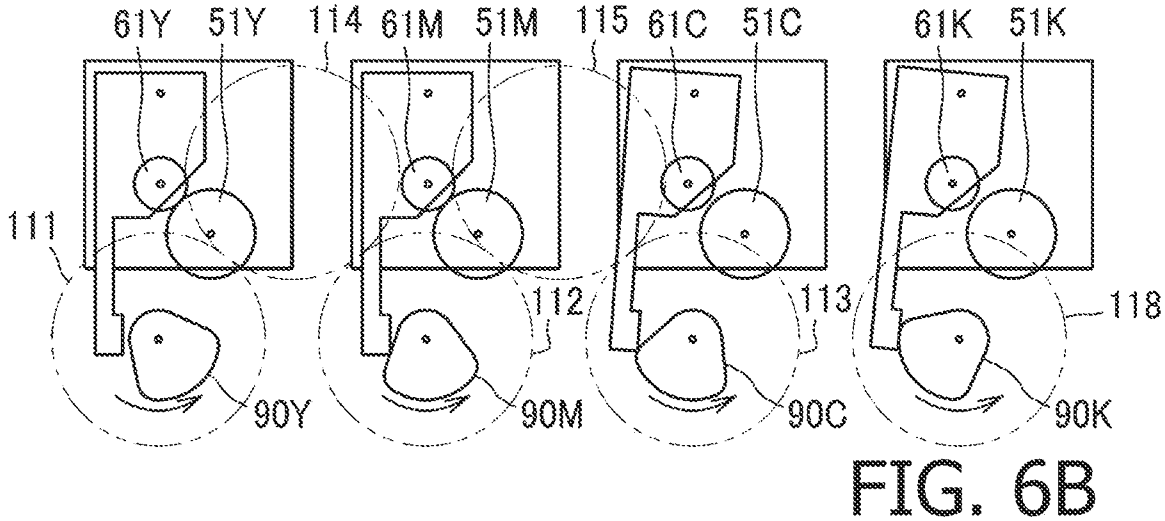
Figure 6C:
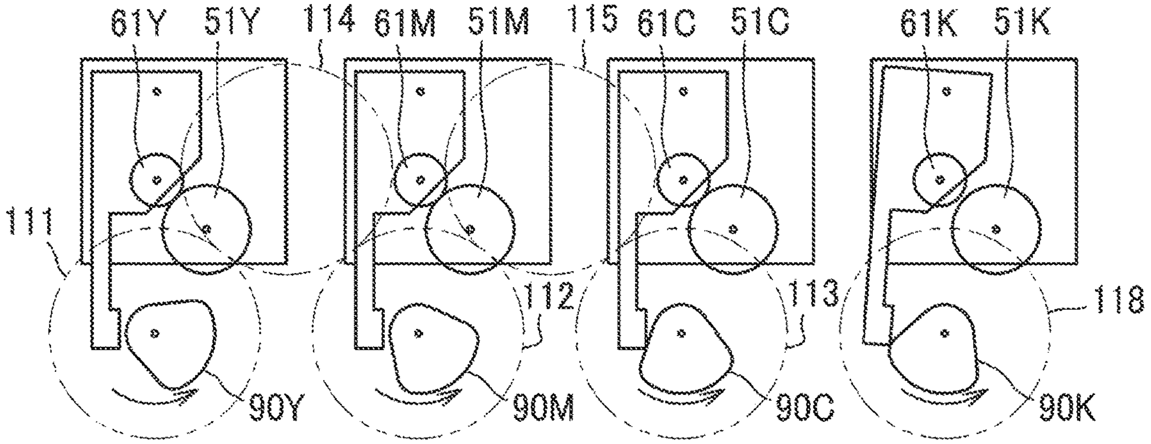
Figure 6D:
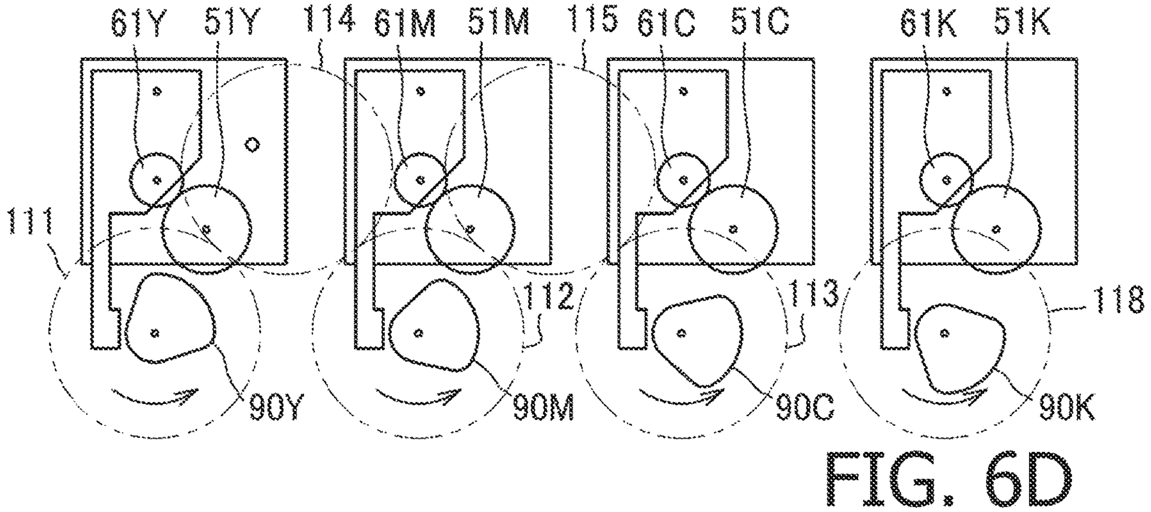

Thereby, the condition of the developing rollers 61Y, 61M, 61C, 61K may be shifted from the condition as shown in FIG. 2, in which all of the developing rollers 61Y, 61M, 61C, 61K are located at the respective separated positions, through a condition as shown in FIG. 6A, in which the developing roller 61Y for yellow is located at the pressed position; a condition as show in FIG. 6B, in which the developing roller 61Y for yellow and the developing roller 61M for magenta are located at the respective pressed positions; a condition as show in FIG. 6C, in which the developing roller 61Y for yellow, the developing roller 61M for magenta, and the developing roller 61C for cyan are located at the respective pressed positions; to a condition as shown in FIG. 6D, in which all of the developing rollers 61Y, 61M, 61C, 61K are located at the respective pressed positions.

Figure 7A:
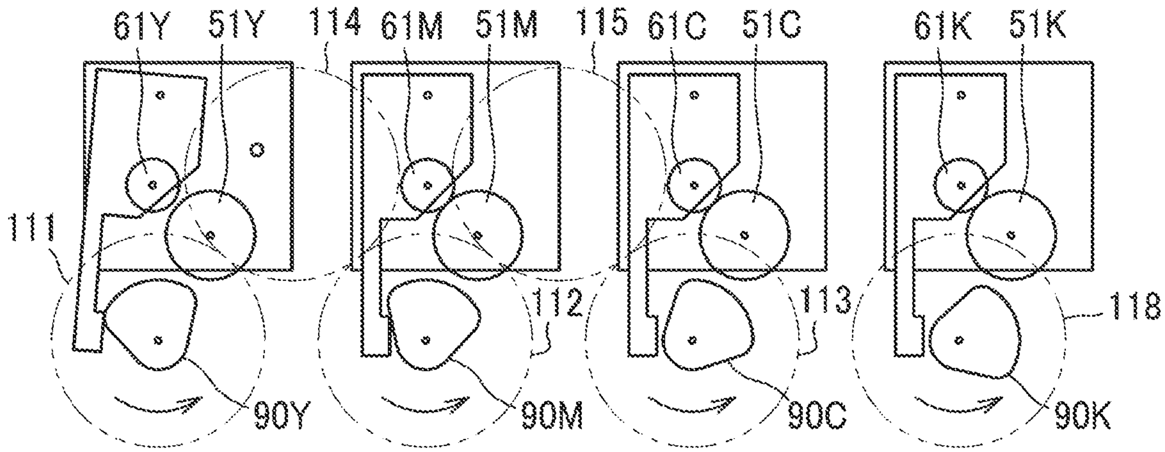
FIGS. 7A-7D illustrate behaviors of the developing rollers to be separated from the photosensitive drums sequentially from upstream to downstream in the image forming apparatus according to the embodiments of the present disclosure.
Figure 7B:
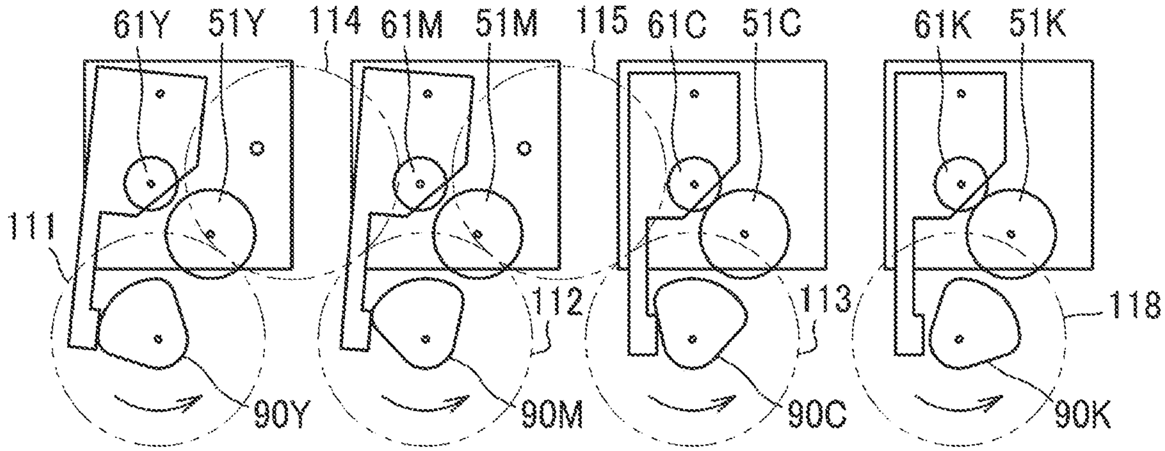
Figure 7C:
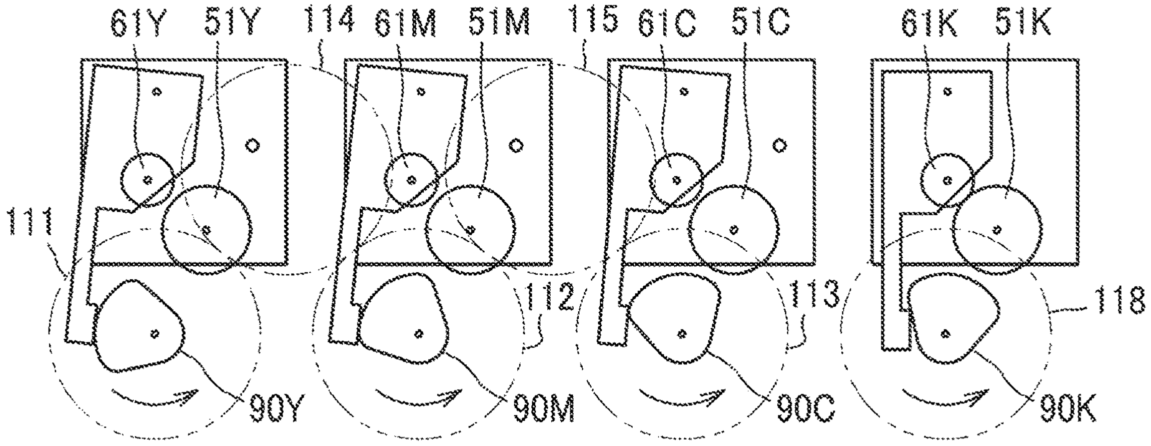
Figure 7D:
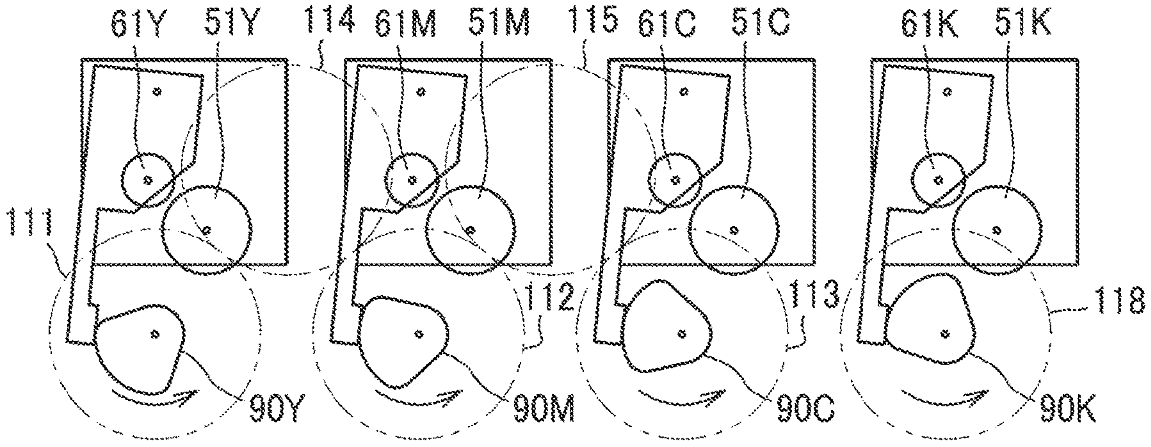

At a timing after the toner image in yellow is completely transferred to the belt 71, the controller 2 may move the solenoid actuator 157 for the color clutch 150A and the solenoid actuator 157 for the monochrome clutch 150K for a predetermined length of time. Thereby, conditions of the developing roller 61 may be shifted from the condition as shown in FIG. 6D, in which all of the developing rollers 61Y, 61M, 61C, 61K are located at the respective pressed positions, through a condition as shown in FIG. 7A, in which the developing roller 61Y for yellow is located at the separated position; a condition as shown in FIG. 7B, in which the developing roller 61Y for yellow and the developing roller 61M for magenta are located at the respective separated positions; a condition as show in FIG. 7C, in which the developing roller 61Y for yellow, the developing roller 61M for magenta, and the developing roller 61C for cyan are located at the respective separated positions; to a condition as shown in FIG. 7D, in which all of the developing rollers 61Y, 61M, 61C, 61K are located at the respective separated positions.

As described above, according to the image forming apparatus 1, the driving force from the motor M may drive the color-linkage gear train 110 through the color-transmission gear train 120A and the color clutch 150A. The color-linkage gear train 110 may rotate the first cam 90Y, the second cam 90M, and the third cam 90C mechanically in conjunction with one another. The color-linkage gear train 110 may operate the first cam 90Y, the second cam 90M, and the third cam 90C in the respective phases shifted from one another. Therefore, the developing rollers 61Y, 61M, 61C for yellow, magenta, and cyan may be pressed against or separated from the photosensitive drums 51Y, 51M, 51C, respectively, at different timings.

According to the present embodiment, the color-transmission gear train 120A engages with the third cam gear 113, which is closer to the fourth cam gear 118 among the first through third cam gears 111-113; therefore, a phase error between the third cam gear 113 and the fourth cam gear 118 may be reduced, and accuracy of timings to move the developing rollers 61Y, 61M, 61C, 61K for the four colors to be pressed against and separated from the photosensitive drums 51Y, 51M, 51C, 51K may be improved.

SECOND EMBODIMENT

Figure 8:
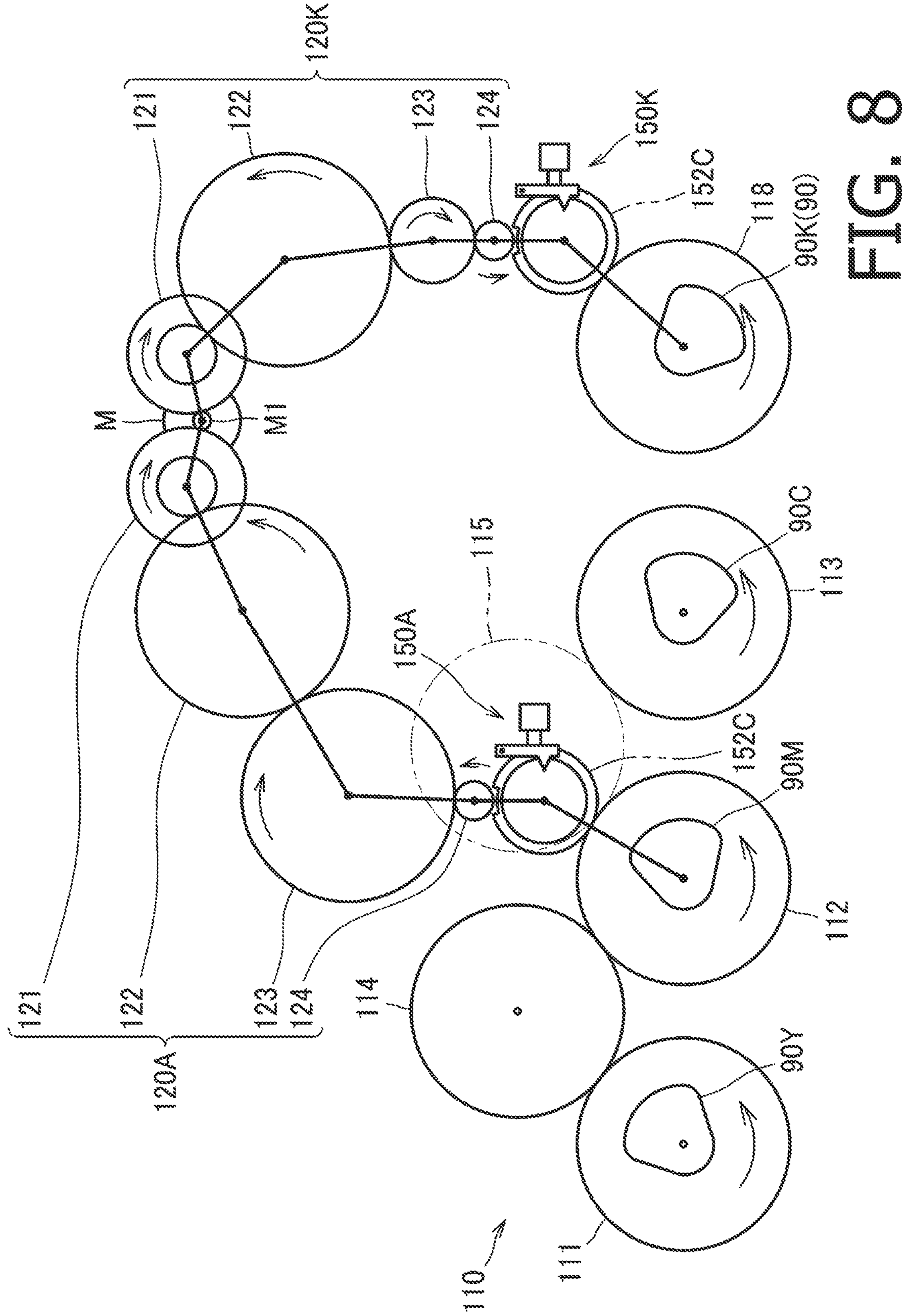
FIG. 8 illustrates gear trains in the image forming apparatus according to a second embodiment of the present disclosure.

Next, a second embodiment of the present disclosure will be described. As shown in FIG. 8, the image forming apparatus 1 in the second embodiment is different from the image forming apparatus 1 in the first embodiment in that the color-transmission gear train 120A does not engage with the third cam gear 113 but engages with the second cam gear 112. In particular, the output gear 152C of the color clutch 150A meshes with the second cam gear 112. Moreover, in the image forming apparatus 1 according to the second embodiment, arrangement of the gears in the color-transmission gear train 120A may be different from the arrangement of the gears in the color-transmission gear train 120A in the first embodiment for absorbing the difference in the positions between the third cam gear 113 and the second cam gear 112.

In this arrangement of the color-transmission gear train 120A according to the second embodiment, the color-linkage gear train 110 may operate the first cam 90Y, the second cam 90M, and the third cam 90C in the respective phases shifted from one another, similarly to the first embodiment. Therefore, the developing rollers 61Y, 61M, 61C for yellow, magenta, and cyan may still be pressed against or separated from the photosensitive drums 51Y, 51M, 51C, respectively, at the shifted timings.

Moreover, according to the second embodiment, the color-transmission gear train 120A engages with the second cam gear 112, which is located at a center among the first through third cam gears 111-113 in the color-linkage gear train 110. Therefore, the phase error between the first cam gear 111 and the third cam gear 113 with respect to a designed value may be minimized.

THIRD EMBODIMENT

Figure 9:
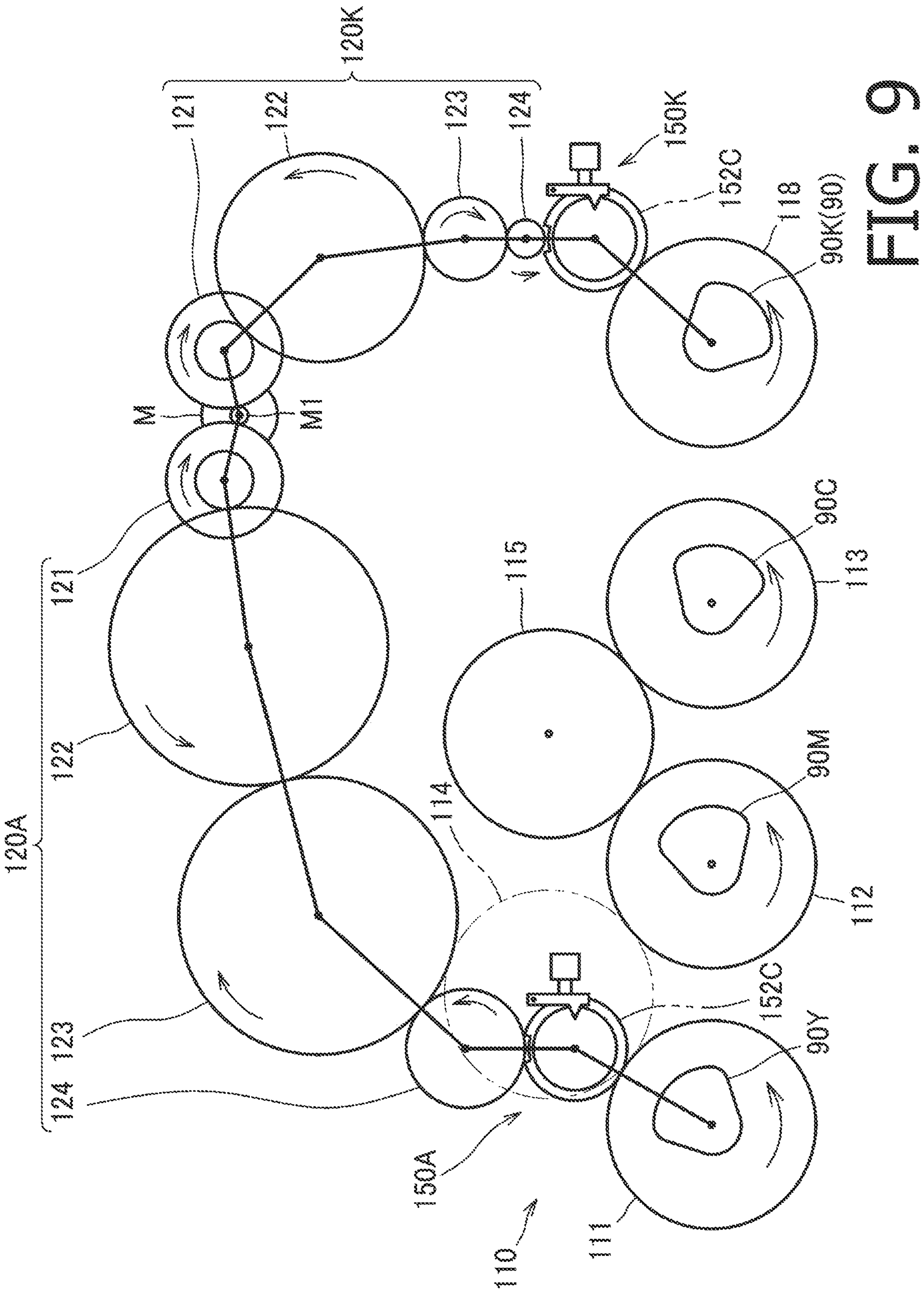
FIG. 9 illustrates gear trains in the image forming apparatus according to a third embodiment of the present disclosure.

Next, a third embodiment of the present disclosure will be described. As shown in FIG. 9, the image forming apparatus 1 in the third embodiment is different from the image forming apparatus 1 in the first embodiment in that the color-transmission gear train 120A does not engage with the third cam gear 113 but engages with the first cam gear 111. In particular, the output gear 152C of the color clutch 150A meshes with the first cam gear 111. Moreover, in the image forming apparatus 1 according to the third embodiment, arrangement of the gears in the color-transmission gear train 120A may be different from the arrangement of the gears in the color-transmission gear train 120A in the first embodiment for absorbing the difference in the positions between the third cam gear 113 and the first cam gear 111.

In this arrangement of the color-transmission gear train 120A according to the third embodiment, the color-linkage gear train 110 may operate the first cam 90Y, the second cam 90M, and the third cam 90C in the respective phases shifted from one another, similarly to the first embodiment. Therefore, the developing rollers 61Y, 61M, 61C for yellow, magenta, and cyan may still be pressed against or separated from the photosensitive drums 51Y, 51M, 51C, respectively, at the shifted timings.

Moreover, according to the third embodiment, the color-transmission gear train 120A engages with the first cam gear 111, which is located to be farthest from the fourth cam gear 118 among the first through third cam gears 111-113; therefore, the color-transmission gear train 120A may be arranged easily in a layout to avoid interference with the monochrome-transmission gear train 120K, and the image forming apparatus 1 may be downsized. Further, for the movement to press the developing roller 61 against the photosensitive drum 51 when printing of an image starts, the timing to start rotating the first cam 90Y may be significant. In this regard, according to the third embodiment, with the color-transmission gear train 120A engaging with the first cam gear 111, which is located at the most upstream position in the moving direction of the belt 71 among the first through third cam gears 111-113, the gear train to engage with the first cam 90Y may be shortened. Therefore, a phase error in the first cam gear 111 with respect to a designed value may be minimized.

FOURTH EMBODIMENT

Figure 10:
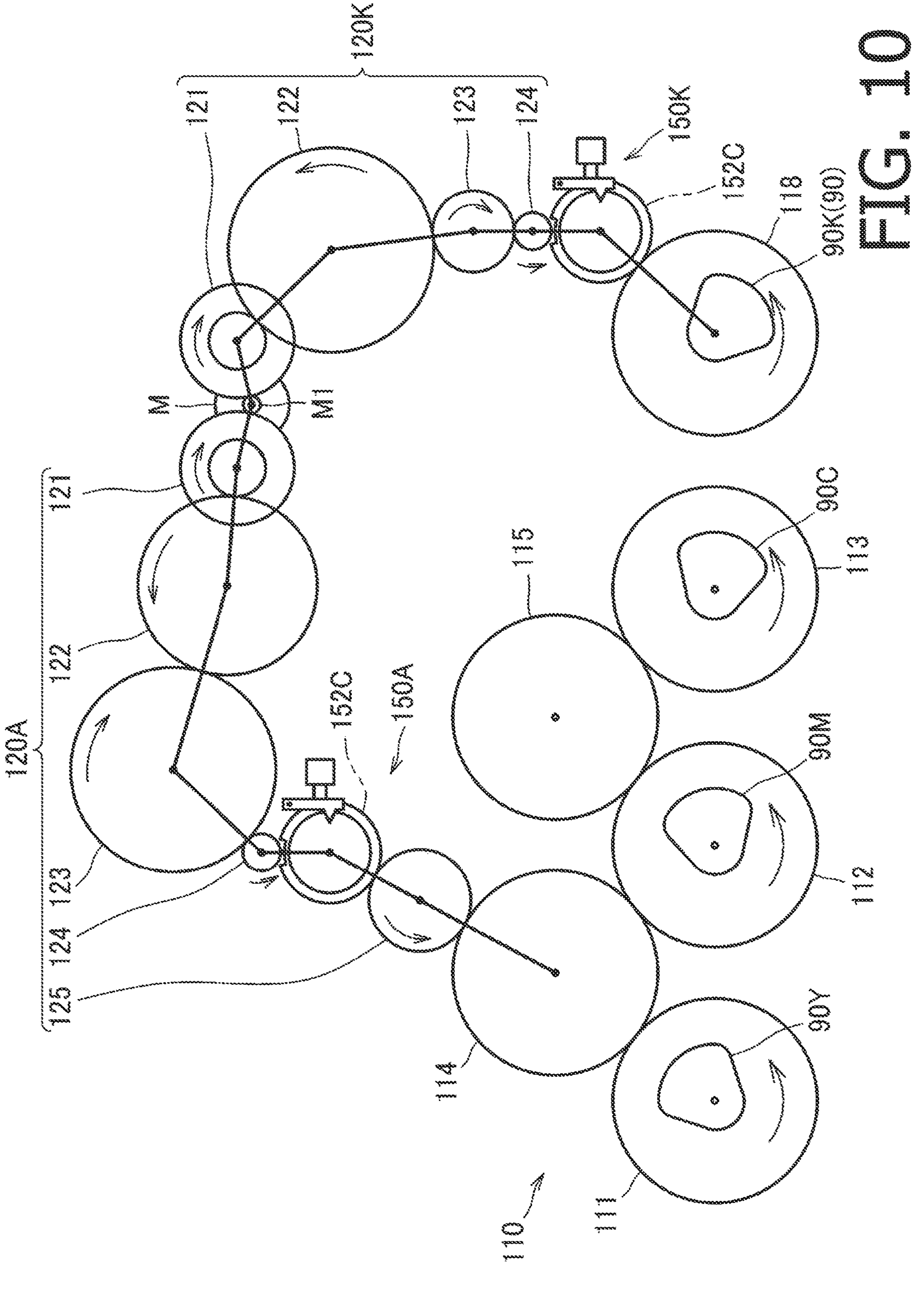
FIG. 10 illustrates gear trains in the image forming apparatus according to a fourth embodiment of the present disclosure.

Next, a fourth embodiment of the present disclosure will be described. As shown in FIG. 10, the image forming apparatus 1 in the fourth embodiment is different from the image forming apparatus 1 in the first embodiment in that the color-transmission gear train 120A does not engage with the third cam gear 113 but engages with the 1-2 idle gear 114. In particular, the color-transmission gear train 120A further has a fifth idle gear 125, and the output gear 152C of the color clutch 150A meshes with the 1-2 idle gear 114 through the fifth idle gear 125. Moreover, in the image forming apparatus 1 according to the fourth embodiment, arrangement of the gears in the color-transmission gear train 120A may be different from the arrangement of the gears in the color-transmission gear train 120A in the first embodiment for absorbing the difference in the positions between the third cam gear 113 and the 1-2 idle gear 114.

In this arrangement of the color-transmission gear train 120A according to the fourth embodiment, the color-linkage gear train 110 may operate the first cam 90Y, the second cam 90M, and the third cam 90C in the respective phases shifted from one another, similarly to the first embodiment. Therefore, the developing rollers 61Y, 61M, 61C for yellow, magenta, and cyan may still be pressed against or separated from the photosensitive drums 51Y, 51M, 51C, respectively, at the shifted timings.

Moreover, according to the fourth embodiment, the color-transmission gear train 120A engages with the 1-2 idle gear 114. Therefore, a phase error between the first cam gear 111 and the third cam gear 113 with respect to a designed value may be reduced. Furthermore, since the 1-2 idle gear 114 is relatively far from the fourth cam gear 118; therefore, the color-transmission gear train 120A may be arranged easily in a layout to avoid interference with the monochrome-transmission gear train 120K, and the image forming apparatus 1 may be downsized.

FIFTH EMBODIMENT

Figure 11:
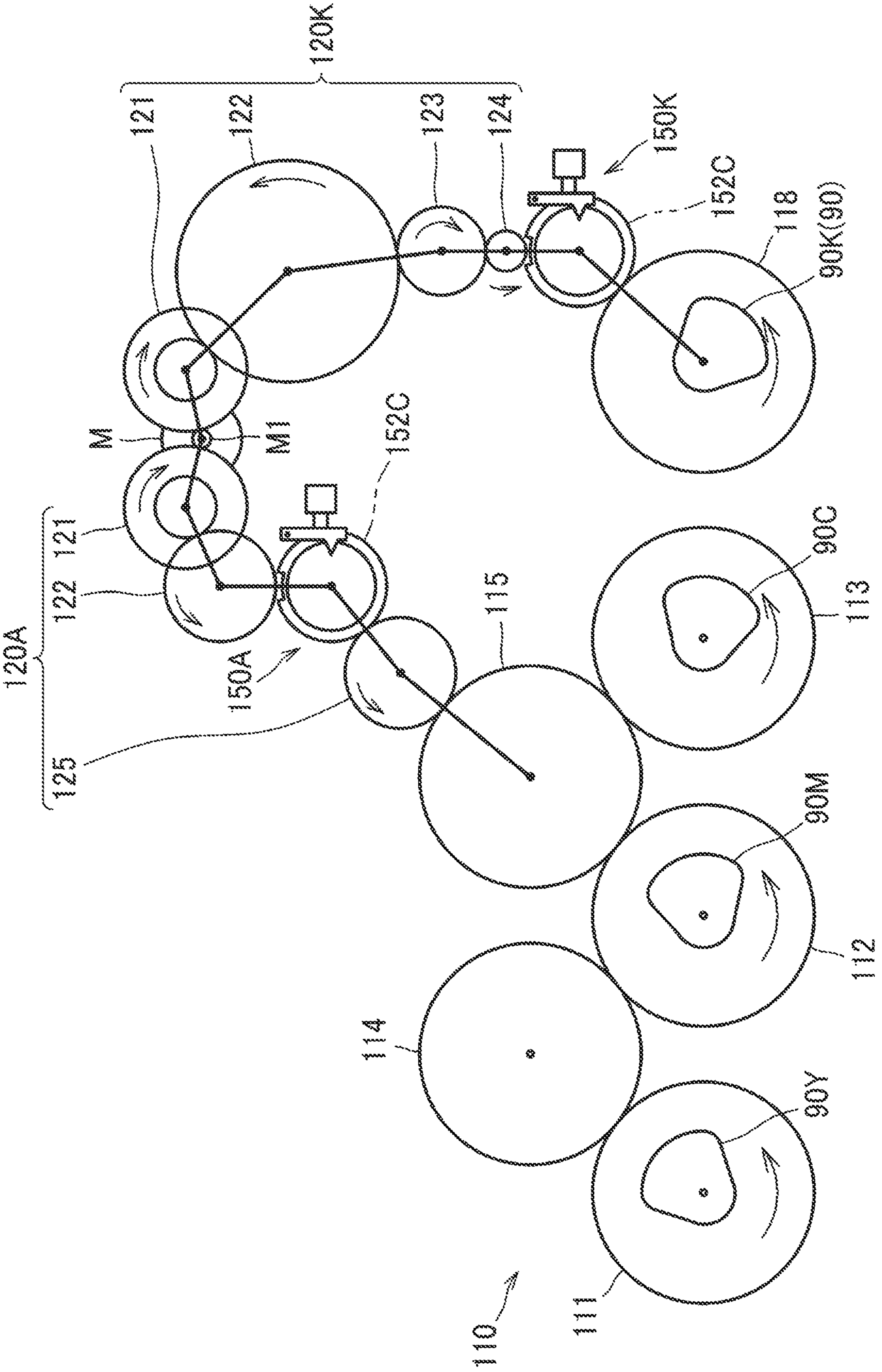
FIG. 11 illustrates gear trains in the image forming apparatus according to a fifth embodiment of the present disclosure.

Next, a fifth embodiment of the present disclosure will be described. As shown in FIG. 11, the image forming apparatus 1 in the fourth embodiment may be different from the image forming apparatus 1 in the first embodiment in that the color-transmission gear train 120A does not engage with the third cam gear 113 but engages with the 2-3 idle gear 115. In particular, the color-transmission gear train 120A further has a fifth idle gear 125, and the output gear 152C of the color clutch 150A meshes with the 2-3 idle gear 115 through the fifth idle gear 125. Moreover, since the first idle gear 121 is relatively close to the 2-3 idle gear 115, the third idle gear 123 and the fourth idle gear 124 may be omitted, and the second idle gear 122 may engage with the color clutch 150A.

In this arrangement of the color-transmission gear train 120A according to the fifth embodiment, the color-linkage gear train 110 may operate the first cam 90Y, the second cam 90M, and the third cam 90C in the respective phases shifted from one another, similarly to the first embodiment. Therefore, the developing rollers 61Y, 61M, 61C for yellow, magenta, and cyan may still be pressed against or separated from the photosensitive drums 51Y, 51M, 51C, respectively, at the shifted timings.

Moreover, according to the fifth embodiment, the color-transmission gear train 120A engages with the 2-3 idle gear 115. Therefore, a phase error between the second and third cam gears 112, 113 for magenta and cyan and the fourth cam gear 118 may be reduced. Furthermore, with the color-transmission gear train 120A engaging with the 2-3 idle gear 115, phase errors in the first cam gear 111 and the third cam gear 113 with respect to a designed value may be reduced.

Although examples of carrying out the invention have been described, those skilled in the art will appreciate that there are numerous variations and permutations of the image forming apparatus that fall within the spirit and the scope of the invention as set forth in the appended claims. It is to be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiments may merely be regarded as examples of the claimed subject matters.

For example, the color clutch 150A may not necessarily be arranged between the color-transmission gear train 120A and the color-linkage gear train 110 but may be arranged between the output gear M1 of the motor M and the color-transmission gear train 120A or between any two of the gears in the color-transmission gear train 120A. Similarly, the monochrome clutch 150K may not necessarily be arranged between the monochrome-transmission gear train 120K and the fourth cam gear 118 but may be arranged between the motor M of the output gear M1 and the monochrome-transmission gear train 120K or between any two of the gears in the monochrome-transmission gear train 120K.

For another example, the first cam 90Y, the second cam 90M, the third cam 90C, and the fourth cam 90K may not necessarily be arranged in the order of the first cam 90Y, the second cam 90M, the third cam 90C, and the fourth cam 90K from upstream to downstream in the moving direction of the belt 71 to move through the range, in which the belt 71 faces the photosensitive drum 51, but may be arranged in an order of the first cam 90Y, the second cam 90M, the third cam 90C, and the fourth cam 90K from downstream to the upstream in the moving direction of the belt 71.

For another example, the present disclosure may not necessarily be applied to the image forming apparatus of so-called intermediate-transfer type, in which the toner images are transferred to the belt 71 and thereafter from the belt 71 to the sheet S, but may be applied to an image forming apparatus, in which toner images may be transferred from the photosensitive drums 51Y, 51M, 51C, 51K to the sheet S directly.

For another example, the image forming apparatus may not necessarily be limited to the printer but may include, for example, a multifunction peripheral machine and a copier.

Moreover, the items in the embodiment described above and modified examples described above may optionally be combined as long as they may coexist without conflicting.

What is claimed is:

1. An image forming apparatus, comprising:

a first developing roller;

a first photosensitive drum;

a second developing roller;

a second photosensitive drum;

a motor;

a first cam configured to move the first developing roller with respect to the first photosensitive drum between a first pressed position, in which the first developing roller is pressed against the first photosensitive drum, and a first separated position, in which the first developing roller is separated from the first photosensitive drum;

a second cam configured to move the second developing roller with respect to the second photosensitive drum between a second pressed position, in which the second developing roller is pressed against the second photosensitive drum, and a second separated position, in which the second developing roller is separated from the second photosensitive drum;

a linkage gear train configured to rotate the first cam and the second cam mechanically in conjunction with one another in phases shifted from one another, the linkage gear train maintaining the phases of the first cam and the second cam to operate the first cam and the second cam in conjunction with one another; and a first transmission gear train configured to transmit a driving force from the motor to the linkage gear train, wherein the linkage gear train includes:

a first cam gear configured to rotate integrally with the first cam;

a second cam gear configured to rotate integrally with the second cam; and a 1-2 idle gear being an idle gear coupling the first cam gear with the second cam gear.

2. The image forming apparatus, according to claim 1, wherein the first transmission gear train engages with the 1-2 idle gear.

3. The image forming apparatus according to claim 1, wherein the first transmission gear train engages with the first cam gear.

4. The image forming apparatus according to claim 1, further comprising:

a third developing roller;

a third photosensitive drum; and a third cam configured to move the third developing roller with respect to the third photosensitive drum between a third pressed position, in which the third developing roller is pressed against the third photosensitive drum, and a third separated position, in which the third developing roller is separated from the third photosensitive drum, wherein the linkage gear train further includes:

a third cam gear configured to rotate integrally with the third cam; and a 2-3 idle gear being an idle gear coupling the second cam gear with the third cam gear, and wherein the linkage gear train is configured to rotate the first cam, the second cam, and the third cam mechanically in conjunction with one another in phases shifted from one another, the linkage gear train maintaining the phases of the first cam, the second cam, and the third cam to operate the first cam, the second cam, and the third cam in conjunction with one another.

5. The image forming apparatus according to claim 4, further comprising:

a fourth developing roller;

a fourth photosensitive drum; and a fourth cam configured to move the fourth developing roller with respect to the fourth photosensitive drum between a fourth pressed position, in which the fourth developing roller is pressed against the fourth photosensitive drum, and a fourth separated position, in which the fourth developing roller is separated from the fourth photosensitive drum, a second transmission gear train configured to transmit the driving force from the motor to the fourth cam separately from the first transmission gear train, wherein the first cam, the second cam, the third cam, and the fourth cam are arranged in an order of the first cam, the second cam, the third cam, and the fourth cam in a direction orthogonal to rotation axes of the first cam, the second cam, the third cam, and the fourth cam.

6. The image forming apparatus according to claim 5, wherein the first transmission gear train engages with the first cam gear.

7. The image forming apparatus according to claim 5, wherein the first transmission gear train engages with the second cam gear.

8. The image forming apparatus according to claim 5, wherein the first transmission gear train engages with the third cam gear.

9. The image forming apparatus according to claim 5, wherein the first transmission gear train engages with the 1-2 idle gear.

10. The image forming apparatus according to claim 5, wherein the first transmission gear train engages with the 2-3 idle gear.

11. The image forming apparatus according to claim 5, wherein the first developing roller and the first photosensitive drum correspond to yellow, the second developing roller and the second photosensitive drum correspond to magenta, the third developing roller and the third photosensitive drum correspond to cyan, and the fourth developing roller and the fourth photosensitive drum correspond to black.

12. The image forming apparatus according to claim 5, wherein the first transmission gear train and the second transmission gear train diverge from a gear attached to an output shaft of the motor.

* * * * *